US010982988B2

(12) United States Patent
Wernet et al.

(10) Patent No.: US 10,982,988 B2
(45) Date of Patent: Apr. 20, 2021

(54) SENSOR ADAPTER

(71) Applicant: Endress + Hauser SE+Co. KG, Maulburg (DE)

(72) Inventors: Armin Wernet, Rheinfelden (DE); Kaj Uppenkamp, Wehr (DE); Robert Schmidt, Schopfheim (DE); Dietmar Fruhauf, Lorrach (DE)

(73) Assignee: ENDRESS + HAUSER SE+CO. KG, Maulburg (DE)

( * ) Notice: Subject to any disclaimer, the term of this patent is extended or adjusted under 35 U.S.C. 154(b) by 450 days.

(21) Appl. No.: 16/061,498

(22) PCT Filed: Nov. 15, 2016

(86) PCT No.: PCT/EP2016/077733
§ 371 (c)(1),
(2) Date: Jun. 12, 2018

(87) PCT Pub. No.: WO2017/102215
PCT Pub. Date: Jun. 22, 2017

(65) Prior Publication Data
US 2020/0264029 A1  Aug. 20, 2020

(30) Foreign Application Priority Data
Dec. 18, 2015  (DE) .................. 10 2015 122 177.2

(51) Int. Cl.
G01F 23/26 (2006.01)
G01F 23/24 (2006.01)
H01R 4/56 (2006.01)

(52) U.S. Cl.
CPC .......... G01F 23/268 (2013.01); G01F 23/242 (2013.01); H01R 4/56 (2013.01)

(58) Field of Classification Search
CPC ........ G01F 23/24; G01F 23/26; G01F 23/242; G01F 23/268; H01R 4/56
See application file for complete search history.

(56) References Cited

U.S. PATENT DOCUMENTS 4,233,143 A * 11/1980 Knudsen ................ G01N 27/30
204/195
4,799,174 A   1/1989 Kramer et al.
(Continued)

FOREIGN PATENT DOCUMENTS

CN      1846335 A    10/2006
CN    103403505 A    11/2013
(Continued)

OTHER PUBLICATIONS

Office Action dated Aug. 28, 2019 in corresponding Chinese application No. 201680074275.7.
(Continued)

*Primary Examiner* — Francis C Gray
(74) *Attorney, Agent, or Firm* — Bacon & Thomas, PLLC

(57) ABSTRACT

A sensor adapter for a device for determining and/or monitoring at least one process variable of a medium in a container with a measuring probe, comprising: at least one adapter measuring probe with at least one adapter electrode, an adapter housing with structure for detachably fastening the sensor adapter on the device, and a contacting unit for the electrical contact of at least one electrode of the device with at least one adapter electrode of the sensor adapter.

13 Claims, 4 Drawing Sheets

(56) References Cited

U.S. PATENT DOCUMENTS

| | | | | | |
|---|---|---|---|---|---|
| 5,391,839 | A | * | 2/1995 | Lang | G01F 23/268 |
| | | | | | 174/540 |
| 6,148,681 | A | * | 11/2000 | Gravel | G01F 23/268 |
| | | | | | 73/866.5 |
| 2004/0027137 | A1 | * | 2/2004 | Sherrard | G01F 23/268 |
| | | | | | 324/644 |
| 2005/0033540 | A1 | | 2/2005 | Bathurst et al. | |
| 2005/0150292 | A1 | * | 7/2005 | Yamamoto | G01N 27/226 |
| | | | | | 73/304 R |

FOREIGN PATENT DOCUMENTS

| | | |
|---|---|---|
| DE | 27 48 191 A1 | 5/1979 |
| DE | 203 13 695 U1 | 1/2004 |
| DE | 10 2004 060 119 A1 | 6/2006 |
| DE | 10 2008 039 465 A1 | 3/2010 |
| DE | 20 2009 009 048 U1 | 1/2011 |
| DE | 10 2012 203 400 A1 | 9/2013 |
| DE | 10 2015 122 177 A1 | 6/2017 |
| EP | 2270437 A1 | 1/2011 |
| GB | 2 113 402 A | 8/1983 |
| JP | S57-48616 A | 3/1982 |

OTHER PUBLICATIONS

German Search Report, German PTO, Munich, dated Mar. 17, 2016.
International Search Report, EPO, The Netherlands, dated Feb. 3, 2017.

* cited by examiner

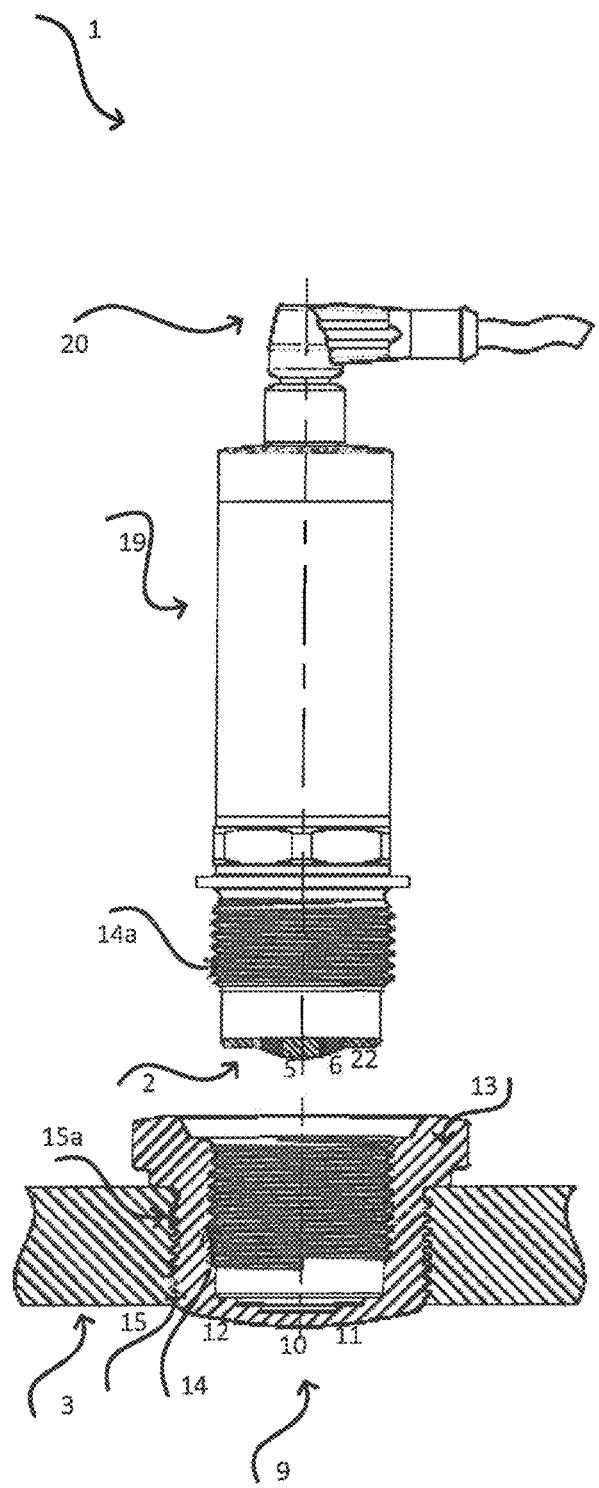
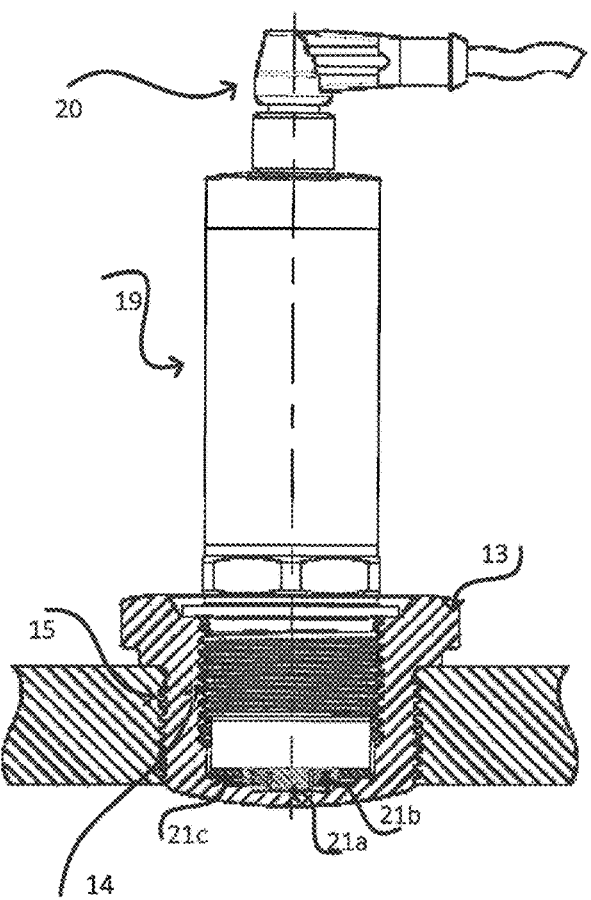
Fig. 3a
Fig. 3b

SENSOR ADAPTER

TECHNICAL FIELD

The invention relates to a sensor adapter with at least one adapter measuring probe and a device for determining and/or monitoring at least one process variable, especially a given fill-level, of a medium in a container.

BACKGROUND DISCUSSION

A given fill-level may be monitored, for example, by means of the conductive measuring method. The underlying measurement principle is known from numerous publications. The fill-level is monitored by detecting whether an electrical contact exists between a probe electrode and the wall of a conductive container or a second electrode via the conductive medium. Corresponding field devices are, for example, marketed by Endress+Hauser under the name LIQUIPOINT.

The fill-level detection by a conductive measuring procedure reaches its limits, if the medium to be monitored has almost no electrical conductivity (<1 µS/cm) or very low electrical conductivity. Media that are difficult to monitor using a conductive measuring method include, for instance, distilled water, molasses, or alcohols. Media with an electrical conductivity of less than 1 µS/cm and a dielectric constant of less than 20 are also problematic. In particular, oils and gases fall into this area. Any changes in the conductivity of the medium compared to the conductivity of air is then too small to be reliably captured by the respective electronics.

The capacitive measuring method is suitable for this case, the method being also known from the state of the art. In this method, the fill-level of the medium is determined from the capacitance of the capacitor formed by a probe electrode and the wall of the container or a second electrode. Depending upon the conductivity of the medium, either the medium itself or an insulation of the probe forms the dielectric of the capacitor. Field devices based upon the capacitive measuring principle are also marketed by Endress+Hauser in many different configurations, e.g., under the name LIQUICAP or SOLICAP.

Although the fill-level detection by means of a capacitive measuring method is possible in principle for conductive and non-conductive media, an insulation of the measuring probe is preferably necessary for media with increasing electrical conductivity, since otherwise the medium might cause the measuring circuit to short-circuit. The impedance of this insulation, especially that of the guard electrode described below, is, however, detrimental for adhesive media since it is an additional impedance connected in series to the medium.

In order to avoid any build-up, German patent, DE 32 12 434 C2 made known the use of a guard electrode that coaxially surrounds the sensor electrode and is at the same electrical potential as the latter. Depending on the build-up, this embodiment poses the problem of generating a suitable guard signal. German patent, DE 10 2006 047 780 A1 expands to describe a measuring probe with a reinforcing device and a limit device that are insensitive to build-up over a large measuring range. Furthermore, German patent, DE 10 2008 043 412 A1 relates to a fill-level measuring device with a memory unit that serves to store threshold values for different media. If such a threshold level is exceeded or not reached, a switch signal is created in such a way that any build-up does not affect reliable switching.

In order to capture a process variable, especially a given fill-level, of a medium with a single measuring device, independent of the electrical characteristics of the medium, German patent, DE102011004807A1 discusses a probe unit with at least partly coaxial design for a device for the capacitive or conductive determination of at least one process variable of a medium in a container. This probe unit may generally be installed front-flush in a container, which is an advantage in particular with regard to hygienic standards that have to be maintained for certain applications.

Such a multi-sensor is also the object of German patent, DE102013102055A1 which describes a method and a device that can be used to determine a given fill-level alternately in a conductive and a capacitive operating mode. Similarly, German patent, DE102013104781A1 discloses a method and a device that allows monitoring at least one media-specific feature of a medium in capacitive and conductive operating mode.

Especially in the capacitive operating mode, the measuring resolution is very dependent on the geometric design of the measuring probe by means of which the range of the respective measurable capacities is determined. If, for example, the measuring probe is designed in a front-flush manner, so that it essentially lines up with the wall of the container after installation, as in the case of the variant marketed by the Applicant under the name FTW33, the measured capacitances can lie in the Femtofarad range. This might cause problems with regard to the measuring resolution for media with dielectric constants of $DK \leq 2$. This especially concerns solids such as, for example coffee powder, milk powder or cocoa, since they only have a low conductivity and are present in form of a mix of the respective powder and air.

SUMMARY OF THE INVENTION

The invention therefore has the object to extend the scope of application for measuring probes working with the capacitive and/or conductive measuring method.

This object is solved according to the invention by a sensor adapter for a device for determining and/or monitoring at least one process variable of a medium in a container with a measuring probe comprising at least

- one adapter measuring probe with at least one adapter electrode,
- an adapter housing with means for detachably fastening the sensor adapter on the device, and
- a contacting unit for the electrical contact of at least one electrode of the device with at least one adapter electrode of the sensor adapter.

The device is, for example, a measuring device working with the capacitive and/or conductive measuring principle. The following explanations about the different exemplary embodiments of this invention also focus on such measuring devices. In particular, the sensor adapter according to the invention can be used in case of front-flush measuring probes, and it is advantageous, if the adapter measuring probe is also a front-flush measuring probe.

The sensor adapter can be attached detachably to the device, especially, it can be screwed onto the device. In this case, the housing of the sensor adapter as well as a housing of the device have, for example, complementary threads to each other. However, other fastenings, such as, for example, means to create a click or clamping closure are conceivable too and equally fall under the present invention.

The housing of the sensor adapter in an embodiment furthermore features means to fasten the sensor adapter on the container. In this case, it must potentially be considered that, in order to attach the device with an adapter on the respective container, in comparison with attaching the device without an adapter, an enlarged opening in the respective container might be necessary. On the one hand, it is conceivable that the sensor adapter is first attached to the device and then the device is connected to the sensor adapter. It is, however, also possible to first attach the sensor adapter to the device and then connect both to the respective container.

The sensor adapter is preferably attached to the device in such a way that by means of the adapter, an adapter measuring probe that is modified compared to the original measuring probe is put into operation. The actual measuring probe is, especially after the sensor adapter has been attached, no longer in direct contact with the medium, but only with the adapter measuring probe of the sensor adapter.

By suitably configuring the sensor adapter, an existing measuring device thus can be suitably retrofitted and/or upgraded according to the desired application. The existing measuring device does not have to be modified for the retrofitting. The at least one adapter electrode is contacted to at least one sensor electrode during the fastening of the sensor adapter to the device by means of the contacting unit. This contacting may be generated automatically on the device during the fastening of the sensor adapter in one embodiment of the invention. Many various options are conceivable for this. The use of combined cutting and bending sheets is cited here as an example, said sheets accomplishing the electrical contacting by a spring effect caused by fastening the sensor adapter.

Accordingly, the range of application of the respective measuring device is clearly extended by using the sensor adapter. The solution according to the invention is furthermore easily implemented and cost-efficient due to the possibility of a refitting of existing measuring devices.

One embodiment of the sensor adapter provides that the adapter measuring probe comprises at least one adapter sensor electrode and an adapter guard electrode. This is, among other things, advantageous in case of adhesive media.

In one especially preferred embodiment, the surface of the adapter measuring probe facing the medium is designed in such a way that the at least one adapter electrode touches the medium. In case an adapter sensor electrode and an adapter guard electrode are provided, both electrodes should touch the medium. Such an embodiment allows, especially in case of a device working with the conductive and/or capacitive measuring principle, both operating modes to be available even when a sensor adapter is used.

Alternatively, it is also possible that the surface of the adapter measuring probe facing the medium is designed in such a way that it is manufactured electrically insulated, especially of an insulating material, in particular a plastic, for example PPS or PEEK. Especially in case of aggressive media, such an embodiment offers high chemical stability and thus extends the life span of the measuring probe and the adapter measuring probe. For this variant, materials or coatings adjusted to one particular application can be applied to the sensor adapter, said coatings, for example, further increasing the chemical stability of the sensor adapter, or are adapted to the respective measuring device for particular hygiene requirements.

In a preferred embodiment of the sensor adapter, the adapter measuring probe, especially with regard to the surface facing the medium, basically finishes in a front flush, especially front flush with the container. This is particularly advantageous in case of applications for which hygienic standards must be maintained.

In another particularly preferred embodiment, the adapter measuring probe has a geometry that differs from the geometry of the measuring probe. One particular advantage results hereby for the capacitive operating mode, for which the respective measuring resolution is highly dependent on the respective geometry of the measuring probe as well as on the respective medium that is used. In this way, an existing measuring device can be planned to be retrofitted for a new application in such a way that the adapter measuring probe is ideally adapted to the respective medium.

It is an advantage, if the surface of the at least one adapter electrode of the adapter measuring probe facing the medium is larger than the corresponding surface of at least one electrode of the measuring probe of the device. An enlarged electrode surface often is also accompanied by an enlarged surface of the adapter measuring probe and advantageously increases the measuring sensitivity, especially in capacitive operating mode, so that a device equipped with a suitable sensor adapter may also be used for media with permittivity values of DK≤2.

Furthermore, it is an advantage, if the at least one adapter electrode is designed in a rotationally symmetric manner, especially ring-shaped. However, an oval embodiment for certain applications, for example, would be conceivable.

One embodiment provides that the at least one adapter measuring probe has a convex shape in the area facing the medium. With a slight curvature of the adapter measuring probe, said probe mainly remains front-flush. Since the convex embodiment also enlarges the surface of the adapter measuring probe that faces the respective medium, especially the at least one adapter electrode, this measure may also increase the obtainable measuring resolution.

It is an advantage, if the adapter measuring probe is at least in part designed coaxially.

One preferred embodiment provides a surge protection that is placed in or on the sensor adapter. This additional surge protection has the task of satisfying the increased requirements on static charging, e.g. in granules, and of protecting the measuring electronics from high-energy discharges. The protection elements may preferably be gas dischargers or suppressor diodes. One example for a suitable switching arrangement is disclosed, for example, in the as yet unpublished German patent application with the file number 102014107927.2.

The task according to the invention is further solved by a device for determining and/or monitoring at least one process variable of a medium in a container, comprising at least one measuring probe with at least one electrode, an electronics unit and a sensor adapter according to at least one of the preceding claims.

The device is especially a measuring device working with the capacitive and/or conductive measuring principle, by means of which especially process variables like, for example, the fill-level of a medium, for example, a given fill-level, the electrical conductivity or the permittivity can be determined. The measuring probe preferably comprises at least one measuring electrode and a guard electrode. Preferably it is a mainly front-flush embodiment of the measuring probe.

In one embodiment, the sensor adapter and the device may be connected detachably. This has the advantage that in case of a defect on the device, it may be removed from an ongoing process without interruption and be repaired or replaced, since the sensor adapter, which in this case is the component of the device with contact to the medium, remains in or on the respective container.

The sensor adapter according to the invention may especially be used for a field device at least for determining and/or monitoring a process variable according to the capacitive and/or conductive measuring principle.

BRIEF DESCRIPTION OF THE DRAWINGS

The invention is described in more detail with reference to the following figures, FIG. 1 through FIG. 5. These show:

FIG. 3 is a field device working in the conductive and/or the capacitive measuring mode with an adapter according to the invention (a) before and (b) after fastening the sensor adapter to the field device.

DETAILED DISCUSSION IN CONJUNCTION WITH THE DRAWINGS

Figure 1:
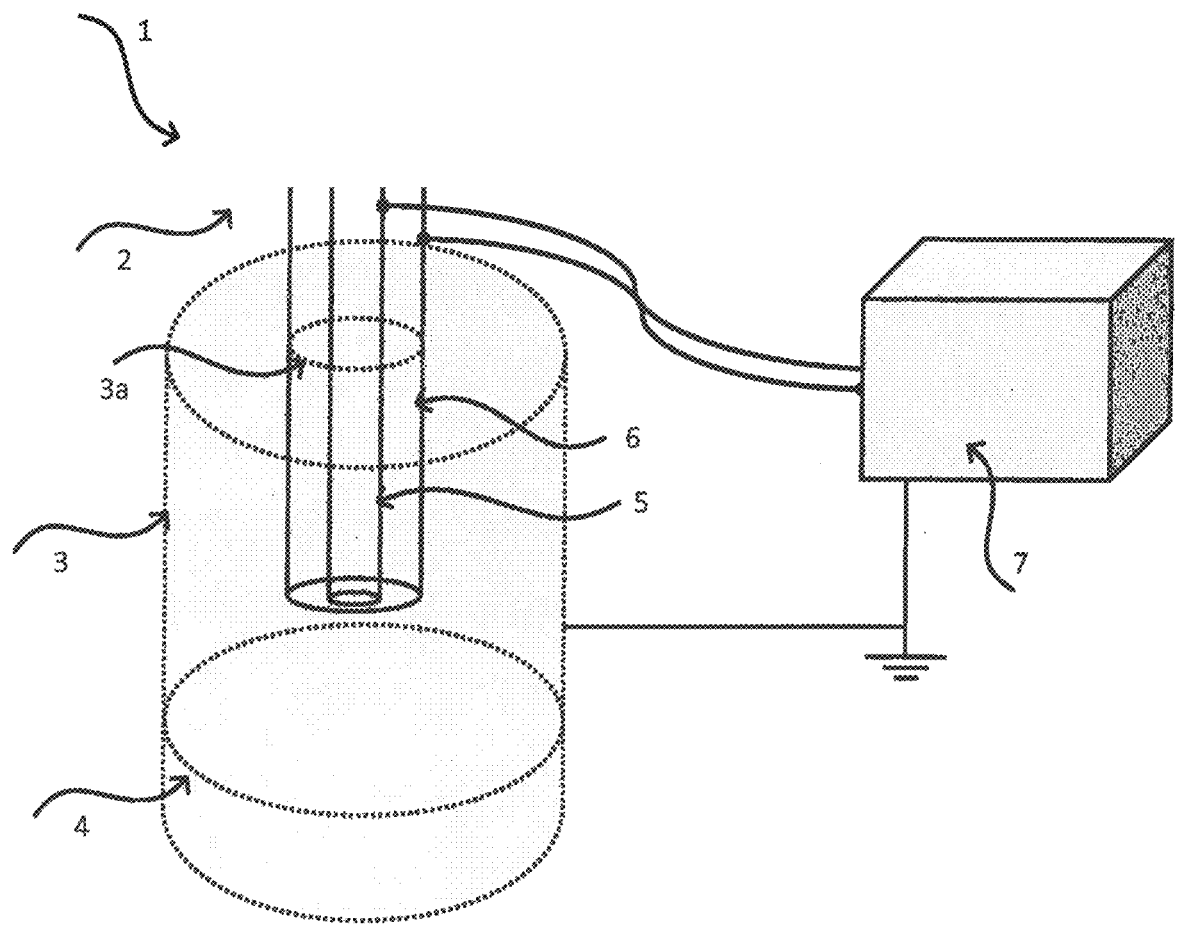
FIG. 1 is a schematic representation of a measuring device working according to the capacitive and/or conductive measuring principle.

FIG. 1 shows the measuring device 1 according to the state of the art which can be used to monitor a process variable such as, for example, a given fill-level by means of a capacitive or conductive measuring method. A measuring probe 2 is inserted into a container 3 which is at least partly filled with a medium 4. In this case, it has been introduced into the container 3 via an opening 3a on the top of said container. In the example shown here, the measuring probe 2 protrudes into the container 3. However, it is understood that front-flush measuring probes are also possible, which mainly finish with the enclosing walls of the container 3, which may be advantageous especially in the case of tubes or containers with small?. In this example, the measuring probe 2 itself consists of a sensor electrode 5 and a guard electrode 6. Both electrodes are electrically connected to an electronics unit 7 which is responsible for the detection, evaluation and/or supply of the signal. In particular, the electronics unit 7 determines and/or monitors the respective process variable on the basis of the response signals generated in capacitive and conductive operating mode such as whether a given fill-level of the medium 3 in container 2 is exceeded or not reached, and generates an appropriate message and/or triggers an appropriate switching operation.

Without loss of generality, the following description refers to a device 1 and a sensor adapter 8 with a measuring probe 2 consisting of at least one sensor electrode 5 and a guard electrode 6. It is understood, however, that other arrangements of a measuring probe 2 and the respective adapter measuring probe 9 corresponding to this measuring probe 2 are possible and also fail within the scope of this invention.

Figure 2A:
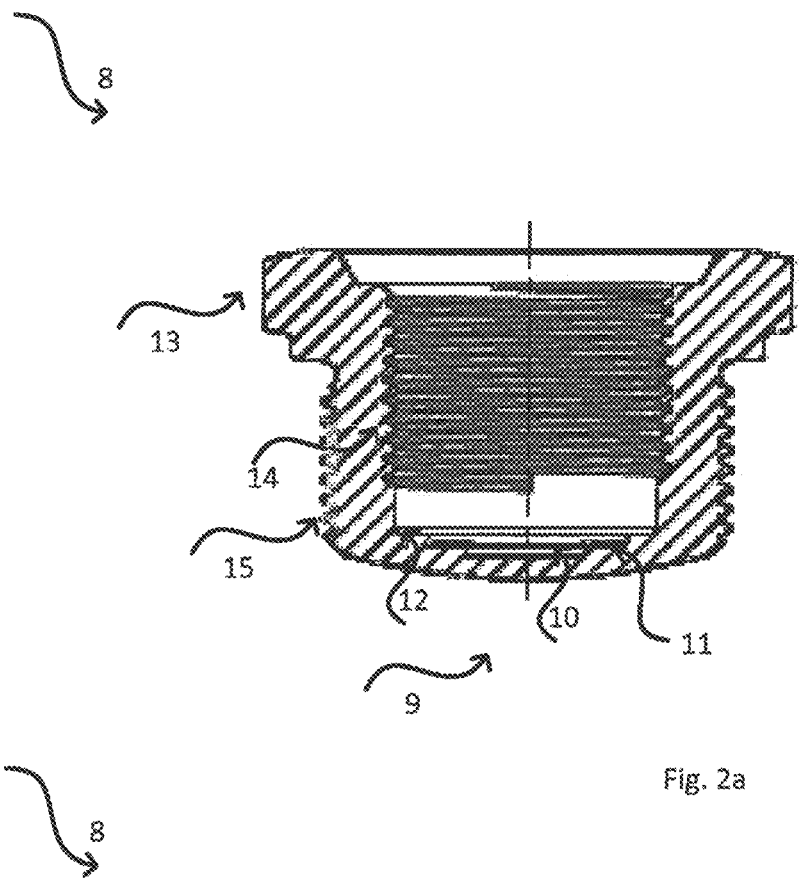
FIG. 2 is a sensor adapter according to the invention (a) with a measuring probe that is electrically insulated against the medium, and (b) with an adapter electrode having a convex surface.

FIG. 2a shows a sensor adapter 8 according to the invention in an arrangement with a measuring probe 2 that is electrically insulated against the medium 3. The adapter measuring probe 9 substantially lines up with the walls of the container. In general, this is therefore a front-flush adapter measuring probe which comprises an adapter sensor electrode 10, and adapter guard electrode 11 and an adapter ground connection 12. In principle, the adapter ground connection may also be omitted in favor or a compact arrangement in such a way that the ground connection is achieved via the sensor ground connection [not shown]. The adapter housing 13 has a screw thread 14 for a detachable connection of the sensor adapter 8 to the device 1, and another screw thread 15 for a detachable connection of the sensor adapter 8 to a container 2.

Figure 2B:
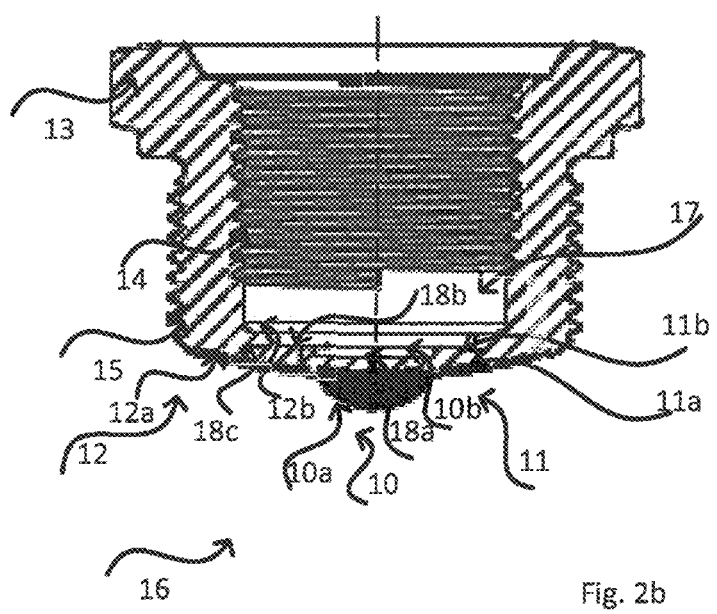

A second embodiment variant for a sensor adapter according to the invention 8 is shown in FIG. 2b. In contrast to the embodiment according to FIG. 2a, the sensor adapter in FIG. 2b has an adapter measuring probe 9 with medium contact. Reference signs that have already been addressed will not be considered below. The adapter sensor electrode 10 is shown here in a convex design. This leads to a further increase in the electrode surface facing the medium 3 and thus to increased sensitivity with regard to the measurement.

The adapter sensor electrode 10, the adapter guard electrode and the adapter ground connection 12 are respectively executed as two-part components. In addition to the exterior electrode parts 10a, 11a, 12a arranged in the exterior area 16, respective interior electrode parts 10b, 11b, 12b are arranged in the interior area 16 of the sensor adapter 8, which are contacted to one another respectively via an electrical contacting 18a, 18b, 18c through the housing 13 of the sensor adapter 8. The adapter measuring probe 9 is contacted to a respective measuring probe 4 of the respective device 1 via the interior electrode parts 10b, 11b, 12b. The interior electrode parts 10b, 11b, 12b may in this either function as the contacting unit themselves, or a separate contacting unit [not shown specifically] may be attached to each of the adapter electrodes 10, 11, 12, for example, as combined cutting and bending sheets that generate an electrical and mechanical contact between the electrodes 10, 11, 12 of the adapter measuring probe 9 and the respective complementary electrode 5, 6 of the measuring probe 2 of the device 1 by means of a spring effect.

Finally, FIG. 3a shows a field device 1 operating according to the conductive and/or capacitive measuring mode with a substantially front-flush measuring probe 2 and a sensor adapter 8 arranged in an opening 3a of the container 3. The electronics unit 6 of the measuring device 1 in this case is enclosed in a housing 19 in a compact arrangement together with the measuring probe 2. On the housing side opposite the measuring probe 2, there is a connection plug 20 to connect the measuring device 1, for example, to a process control system (not shown). Any reference signs that have already been illustrated are not addressed again in context with FIG. 3 either.

The screw thread 15 for attaching the sensor adapter 8 to the container 3 is designed in such a way that it is complementary to the screw thread 15a included on the container 3. Similarly, the screw thread 14 for attaching the sensor adapter 8 on the device 1 is arranged in such a way that it is complementary to the screw thread on the measuring device 1.

The measuring probe 2 of the measuring device shows a sensor electrode 5, a guard electrode 6 and a ground connection 22. Correspondingly, the adapter measuring probe 9 has an adapter sensor electrode 10, an adapter guard electrode and an adapter ground connection 12 coordinated with the electrodes 5, 6, 22 of the measuring device 1, and, as in FIG. 2a, it is designed in such a way that the electrodes 10, 11, 12 are electrically insulated against the medium 3.

FIG. 3b shows the sensor adapter 8 and the measuring device 1 from FIG. 3a, whereas the sensor adapter 8 is also attached to the measuring device 1 for FIG. 3b. In order to achieve greater clarity, not all reference signs from FIG. 3a are repeated in the depiction of FIG. 3b.

The contact between the electrodes 5, 6, 22 of the measuring device 1 and the adapter electrodes 10, 11, 12 of the sensor adapter 8 is achieved by the contactings 21a, 21b, 21c. Those may be combined cutting and bending sheets that create an electrical and mechanical contact by a spring effect through screwing the measuring device 1 into the sensor adapter 8. Alternatively, a contacting in case of two-part design electrodes 10, 11, 12 of the sensor adapter 8 may also occur via the respective electrode interior parts 10a, 11a, 11b.

Figure 4:
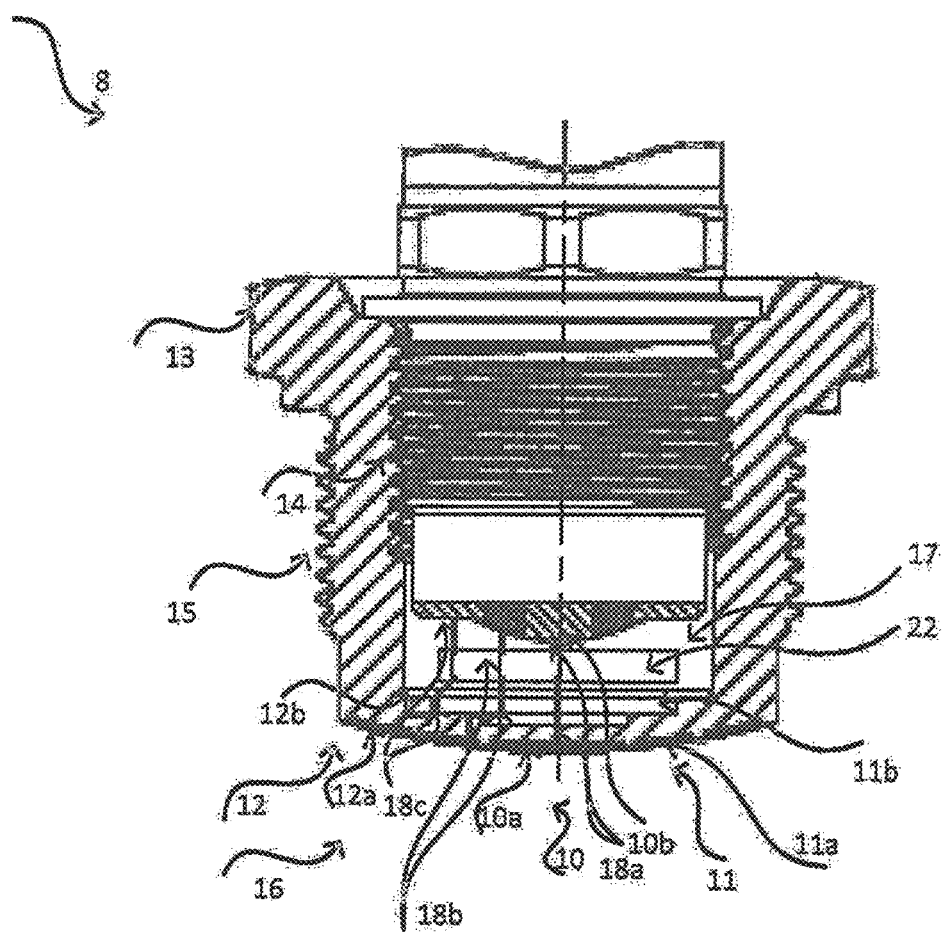
FIG. 4 is a sensor adapter according to the invention with surge protection.

FIG. 4 then shows another arrangement for a sensor adapter 8 according to the invention. This sensor adapter has a measuring probe 9 with medium contact with an adapter sensor electrode 10, an adapter guard electrode and an adapter ground connection, similar to FIG. 2b. In contrast to FIG. 2b, however, the adapter sensor electrode firstly is not designed in a convex arrangement. Furthermore, a surge protection 22 in the form or a bleeder is integrated into the sensor adapter 8 from FIG. 4. The electrodes 10, 11, 12 of the adapter measuring probe 9 are executed in a two-part design as in FIG. 2b, i.e. they consist of the exterior electrode parts 10a, 11a, 12a arranged in the exterior area 16, and the interior electrode parts 10b, 11b, 12b arranged in the interior area 16 of the sensor adapter 8. In contrast to FIG. 2b, the contactings 18a, 18b, 18c between the exterior electrode parts 10a, 11a, 12a and the interior electrode parts 101b, 11b, 12b are also executed in a two-part design in such a way that the exterior electrode parts 10a, 11a, 12a and the interior electrode parts 101b, 11b, 12b are connected to each other via the surge protection 22.

The invention claimed is:
1. A sensor adapter for a device for determining and/or monitoring at least one process variable of a medium in a container with a measuring probe, comprising at least:
   one adapter measuring probe with at least one adapter electrode;
   an adapter housing with means for detachably fastening the sensor adapter on the device; and
   a contacting unit for the electrical contact of at least one electrode of the device with at least one adapter electrode of the sensor adapter;
   wherein said one adapter measuring probe has a geometry that differs from the geometry of said measuring probe, and
   wherein the surface of the at least one adapter electrode of the measuring probe facing the medium is larger than the corresponding surface of at least one electrode of the measuring probe of the device.
2. The sensor adapter according to claim 1, wherein:
   said one adapter measuring probe comprises at least one adapter sensor electrode and an adapter guard electrode.
3. The sensor adapter according to claim 1, wherein:
   the surface of said one adapter measuring probe facing the medium is designed in such a way that said at least one adapter electrode is in contact with the medium.
4. The sensor adapter according to claim 1, wherein:
   the surface of said one adapter measuring probe facing the medium is designed in such a way that it is manufactured electrically insulated, especially of an insulating material, in particular a plastic, for example PPS or PEEK.
5. The sensor adapter according to claim 1, wherein:
   said one adapter measuring probe, especially with regard to the surface facing the medium, basically finishes in a front-flush manner, especially front-flush with said container.
6. The sensor adapter according to claim 1, wherein:
   the at least one adapter electrode is designed in a rotation symmetrical, especially ring-shaped manner.
7. The sensor adapter according to claim 1, wherein:
   said at least one adapter electrode has a convex shape in the area facing the medium.
8. The sensor adapter according to claim 1, wherein:
   the adapter measuring probe is constructed at least partly coaxially.
9. The sensor adapter according to claim 1, further comprising:
   a surge protection.
10. A device for determining and/or monitoring at least one process variable of a medium in a container, comprising at least one measuring probe with at least one electrode, an electronics unit and a sensor adapter comprising a sensor adapter for a device for determining and/or monitoring at least one process variable of a medium in a container with a measuring probe, comprising at least: one adapter measuring probe with at least one adapter electrode; an adapter housing with means for detachably fastening the sensor adapter on the device; and a contacting unit for the electrical contact of at least one electrode of the device with at least one adapter electrode of the sensor adapter;
    wherein said one adapter measuring probe has a geometry that differs from the geometry of said measuring probe, and
    wherein the surface of the at least one adapter electrode of the measuring probe facing the medium is larger than the corresponding surface of at least one electrode of the measuring probe of the device.
11. The device according to claim 10, wherein:
    said sensor adapter may be connected with the device in a detachable manner.
12. The device according to claim 11, wherein:
    the process variable is given by a fill-level, the electric conductivity or the permittivity of the medium.
13. The use of the sensor adapter according to claim 1 at least for determining and/or monitoring a process variable according to the capacitive and/or conductive measuring principle.

* * * * *